Patented Dec. 16, 1947

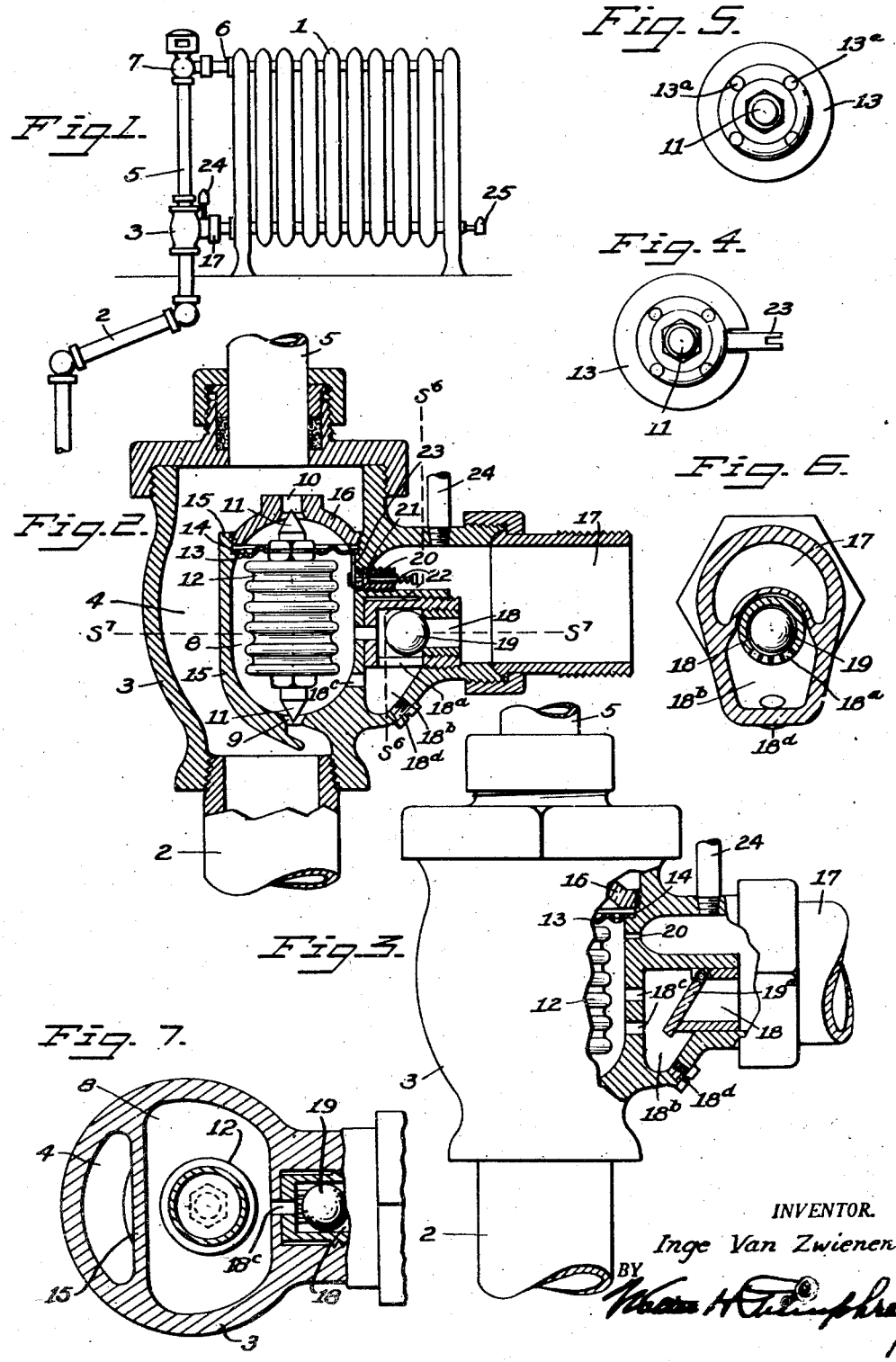

2,432,838

UNITED STATES PATENT OFFICE 2,432,838

THERMOSTATIC STEAM TRAP

Inge Van Zwienen, Brooklyn, N. Y.

Application January 24, 1945, Serial No. 574,291

12 Claims. (Cl. 236—56)

The invention relates generally to heating systems and particularly to certain features of improvement which, while capable of being applied to serve various purposes, are specially adapted, as herein embodied, for use with the radiators of a one-pipe gravity return system, to cooperate with manually or thermostatically controlled steam supply valves, to maintain the radiators in effective operation for producing heat at any desired temperature. The improvement may be readily applied to such a heating system, without requiring material change therein and will result in converting it, in effect, into a two-pipe system, with all the well known accompanying advantages.

More specifically, the invention resides essentially in a highly efficient thermostatically operated trap, for automatically effecting the required drainage of radiators to prevent the accumulation of condensate therein and the resulting disadvantages.

Prominent among the important features of the invention may be mentioned the following: first, a drainage trap located in the live steam connection but in non-interfering relation to the maintenance of a full steam supply to the radiators, the trap having a valved opening at the top for the entrance of live steam, to effect equalization of pressure between the trap and the supply line and a valved opening at the bottom for the discharge of the trapped condensate; second, a thermostatic control valve for the trap, which consists, preferably, of a diaphragm-supported bellows type of thermostat, having valves at opposite ends, which, under flexing of the diaphragm and contraction and expansion of the bellows, act to open and close the trap at the upper and lower ends; third, the provision of means for automatically effecting, practically instantaneously, an equalization of the high pressure in the trap and the low pressure of the condensate in the radiator, as the trap is periodically closed by the thermostatic valves, which permits instant flow of condensate into the trap, as the head of the accumulated condensate in the radiator is sufficient, under the condition of balanced pressures, to force and open a check valve controlling a communicating passage; fourth, the provision of perforations in the diaphragm that supports the thermostat in the trap, for free communication between the trap chambers above and below the diaphragm and fifth, the provision of an air vent in the condensate connection adjacent to the trap.

Other features of the invention not specially mentioned above, will be brought to attention in the detailed description that follows.

A preferred embodiment of the invention is illustrated in the accompanying drawing but I do not wish to be understood as intending to limit myself to either the form or details shown, as various changes may be made therein without departing from the spirit and scope of the invention as outlined in the appended claims.

In the drawings:

Fig. 1 is a view in elevation showing a radiator connected in a one-pipe heating system, with my invention applied.

Fig. 2 is a vertical section on an enlarged scale, of a thermostatic trap unit, constructed in accordance with my invention.

Fig. 3 is a view in elevation, partly in section, showing a slightly modified construction.

Fig. 4 is a detail plan view of the diaphragm shown in Fig. 2, the projection from the outer edge being shown, for clearness of illustration, extending in the plane of the diaphragm but in use is bent down at right angles to the same.

Fig. 5 is a similar view of the diaphragm partly shown in Fig. 3,

Fig. 6 is a detail cross section, on the line $s^6$—$s^6$, of Fig. 2 and

Fig. 7 is a horizontal section, on the line $s^7$—$s^7$, of Fig. 2.

Referring now to the drawings, 1 represents a well known type of radiator such as is now in common use. 2 indicates a live steam pipe from a boiler (not shown) connected to supply the radiator and also to serve as a return for condensation from the same, as is customary in one-pipe heating systems.

Instead of the usual radiator valve, a casing 3 is interposed in the live steam and drainage connections of the radiator and provides an open unobstructed connecting passage 4 between pipe 2 and an upward extension 5 from the casing 3, that is connected to the radiator at a point 6 near the top thereof. A suitable modulating or thermostatic valve 7 is provided in the upward extension 5, by which the supply of live steam to the radiator may be regulated for any desired pressure.

A trap 8, within the casing 3, controls the flow of condensation from the radiator to the live steam pipe 2, by which it is returned to the boiler. The trap is provided with a bottom opening 9 and a top opening 10, both leading to the live steam passage 4 in the casing and both controlled by valves 11, 11, formed in part with and operated by the expansion and contraction of a thermostat 12. The thermostat is carried and supported by a diaphragm 13, seated to have limited vertical movement in an annular groove 14 formed between the trap casing proper 15 and a removable screw cap 16. The diaphragm has a number of openings formed therein, as indicated at 13ª, to provide free communication between the trap chambers above and below the diaphragm.

In operation, the expansion of the thermostat causes the valves to close the trap opening 9, first and secondly trap opening 10 against the entrance therein of live steam. On initial contraction, the upper valve is first withdrawn from the opening 10, permitting live steam to enter the trap and effect equalization of pressure between the trap and the live steam supply. On continued contraction of the thermostat, the lower valve is withdrawn from the opening 9, permitting drainage of the condensate from the trap to the live steam line. Live steam which replaces the condensate in the trap, heats and expands the thermostat to complete the cycle.

The flow of condensation from the drainage connection 17 of the radiator to the trap, is through a connecting passage 18, controlled by a check valve 19 of either the ball or gate type, as shown. Directly below the passage 18 and communicating with it through one or more narrow slot-like openings 18ª, there is a mud pit 18ᵇ for the deposit and accumulation of foreign matter carried by the drainage, Overflow from the pit enters the trap through one or more openings 18ᶜ and a screw plug 18ᵈ provides access to the pit for cleaning. The valve 19 opens to permit the flow to the trap only when the trap is closed and the pressure in the trap and the pressure in the drainage connection of the radiator are equalized. To effect such an equalization of these pressures, a vent 20 is provided in the wall between the trap and the drainage connection, which may be either valved as indicated at 21 in Fig. 2, or open, as shown in Fig. 3. When a valve is employed in the vent, it is arranged to open when the trap is closed and close when the trap is open. A spring 22 is accordingly used to close the valve and a downwardly projecting lug 23 from the diaphragm, acts, by having its free end moved outward somewhat by the flexing of the diaphragm and the expansion of the thermostat, to draw the valve from its seat and hold it thus with the vent open until the thermostat contracts and opens the trap.

A well known form of vacuum air valve is employed for the escape of air from the radiator. It may be placed in either the drainage connection, as indicated at 24, or at the opposite side of the radiator, as indicated at 25.

From the foregoing, it will be seen that the radiators are individually controlled and maintained at the highest point of heating efficiency by action of the traps, which are automatic in operation and require no adjustment or other attention.

When a radiator is shut off by closing the steam regulating valve 7 the trap is so designed as to prevent the flow of live steam through the trap into the radiator through the drainage connection.

Upon opening the valve 7, to start up a cold radiator, live steam entering the same will be instantly condensed, causing more or less accumulation of water therein, which flows by gravity through the drainage connection into the trap, the equalization of pressure through the vent 20, permitting such flow, which will continue until the thermostat contracts sufficiently under the action of the low temperature condensation, to open the trap and thereupon the water in the trap will be discharged by gravity into the live steam pipe 2 and returned to the boiler. The trap remains open only long enough for live steam to enter and expand the thermostat sufficiently to close it and the above described cycle will be periodically repeated as long as steam is supplied to the radiator.

The above described combination of trap and modulating valve, when installed on all radiators of a one-pipe gravity return system, enables any desired temperature to be maintained.

I claim:

1. An automatic drainage trap comprising a casing provided with live steam supply and drainage connections, a drainage trap within the casing opening at different levels into the live steam supply connection, valves controlling the aforesaid trap openings, a thermostat in the trap for operating the valves, the said thermostat acting when contracted by the accumulated condensate in the trap, to open the valves for the discharge of the condensate and the admission therein of live steam and when expanded by the live steam admitted, acting to close the valves and hold them closed until again contracted by an additional accumulation of condensate in the trap.

2. A drainage trap, as defined in claim 1, in which there is an unobstructed passage through the casing for live steam that by-passes the trap.

3. An automatic drainage trap comprising a casing provided with live steam supply and drainage connections, a drainage trap within the casing opening at its upper and lower ends into the live steam supply connection, valves controlling the aforesaid trap openings, a thermostat in the trap for imparting operating movement in opposite directions to the valves to open and close the same, the said thermostat acting when contracted by the accumulated condensate in the trap, to open the valves for the discharge of the condensate and the admission therein of live steam and when expanded by the live steam admitted, acting to close the valves and hold them closed until again contracted by an additional accumulation of condensate in the trap.

4. A drainage trap, as defined in claim 3, in which there is an open passage through the casing for live steam that partly surrounds and by-passes the trap.

5. An automatic drainage trap comprising a casing provided with live steam supply and drainage connections, a drainage trap within the casing opening at its upper and lower ends into the live steam supply connection, valves controlling the aforesaid trap openings, a thermostat in the trap for imparting operating movement in opposite directions to the valves to open and close the same, a diaphragm supporting the thermostat and dividing the interior of the trap into upper and lower chambers and means providing continuous communication between the chambers.

6. An automatic drainage trap comprising a casing provided with live steam supply and drainage connections, a drainage trap within the casing opening at its upper and lower ends into the live steam supply connection, valves controlling the aforesaid trap openings, a thermostat in the trap for imparting operating movement in opposite directions to the valves to open and close the same, and an apertured diaphragm mounted in the trap adjacent to the upper valved opening thereof, the said diaphragm supporting the thermostat and dividing the trap into upper and lower chambers opening one into the other through the apertures in the diaphragm.

7. A drainage trap, as defined in claim 1, in which the drainage connection to the trap is controlled by a valve adapted to yield and admit condensate to the trap when the pressure in the trap and in the drainage connection are equalized.

8. A drainage trap, as defined in claim 1, in which the drainage connection to the trap is controlled by a pressure-closed check valve adapted to be opened by the head of the accumulated condensate in the drainage connection to admit the condensate to the trap, when the pressure in the trap is not in excess of that in the drainage connection.

9. A drainage trap, as defined in claim 1, in which an air vent is provided in the drainage connection adjacent to the trap.

10. A drainage trap, as defined in claim 1, in which a valved air vent is provided in the drainage connection adjacent to the trap.

11. An automatic drainage trap comprising a casing provided with live steam supply and drainage connections, a drainage trap within the casing having axially aligned top and bottom openings therein, said bottom opening providing a passage for drainage from the drainage connection to the live steam supply connection, a one-way pressure operated valve in the passage between the trap and the drainage connection controlling the drainage flow into the trap and a vent through which pressure is equalized between the trap and the drainage connection when the trap is closed, a thermostatic valve operative between said axially aligned top and bottom openings for opening and closing the trap, the said thermostatic valve opening the trap when contracted to discharge accumulated condensation into the live steam supply connection and admit live steam to the trap to expand the valve and close the trap, and an open unobstructed passage through the casing for live steam, that by-passes the trap.

12. A drainage trap, as defined in claim 11, in which the vent, through which pressure is equalized between the trap and the drainage connection, is controlled by a valve that is automatically opened when the thermostatic valve is expanded to close the trap.

INGE VAN ZWIENEN.

REFERENCES CITED

The following references are of record in the file of this patent:

UNITED STATES PATENTS

| Number | Name | Date |
|---|---|---|
| 1,884,857 | Randall | Oct. 25, 1932 |
| 2,028,173 | Thomas | Jan. 21, 1936 |